US007024754B1

(12) United States Patent
Crowder et al.

(10) Patent No.: US 7,024,754 B1
(45) Date of Patent: Apr. 11, 2006

(54) METHOD OF ASSEMBLING AN ACTUATOR ASSEMBLY OF A DISK DRIVE AND OF REDUCING TORQUE OUT RETENTION VALUES IN SUBSEQUENT DE-SWAGING

(75) Inventors: Mark S. Crowder, Broomfield, CO (US); Richard E. Rupp, Jr., Berthoud, CO (US); John McCrandall, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 553 days.

(21) Appl. No.: 09/975,593

(22) Filed: Oct. 10, 2001

Related U.S. Application Data

(60) Provisional application No. 60/239,159, filed on Oct. 10, 2000.

(51) Int. Cl.
*G11B 5/127* (2006.01)
*H04R 31/00* (2006.01)

(52) U.S. Cl. ............................... 29/603.03; 29/603.06; 29/603.07; 29/236; 360/264.1; 360/265; 360/266.1; 184/6.26; 184/14

(58) Field of Classification Search ............. 29/603.03, 29/603.06, 603.07, 236; 360/265.6, 266.1, 360/264.1, 265; 184/6.26, 14
See application file for complete search history.

(56) References Cited

U.S. PATENT DOCUMENTS 4,215,480 A * 8/1980 Fisher et al. .................. 33/706
4,987,975 A * 1/1991 Liu ......................... 184/105.1
5,051,855 A * 9/1991 Ghose et al. ............ 360/264.3
5,185,683 A * 2/1993 Oberg et al. ............ 360/244.6
5,191,705 A * 3/1993 Toensing ..................... 29/764
5,879,578 A * 3/1999 Chung et al. ............... 216/100
6,185,075 B1 * 2/2001 Tsujino et al. ........... 360/265.7

* cited by examiner

*Primary Examiner*—Paul D. Kim
(74) *Attorney, Agent, or Firm*—Sheridan Ross P.C.

(57) ABSTRACT

A method is provided for assembling an actuator assembly of a disk drive. The method includes providing an actuator arm, providing a suspension arm, fixing a swage plate to the suspension arm, the swage plate including a swage boss extending therefrom, depositing a film lubricant upon at least an outer surface of the swage boss, and attaching the suspension arm to the actuator arm by swaging. A method is also provided for reducing torque out retention values between the actuator arm and the suspension arm when the actuator arm and suspension arm must be separated in a subsequent de-swaging process. This method includes providing an outer surface of the swage boss, and applying a lubricant film coating to the outer surface of the swage boss. A preferred thin film lubricant may be applied by emersion and draining, localized spraying, or various deposition processes. Application of the lubricant has also shown to improve gram load uniformity and to reduce adverse distortion to the actuator assembly which otherwise occurs during swaging.

10 Claims, 2 Drawing Sheets

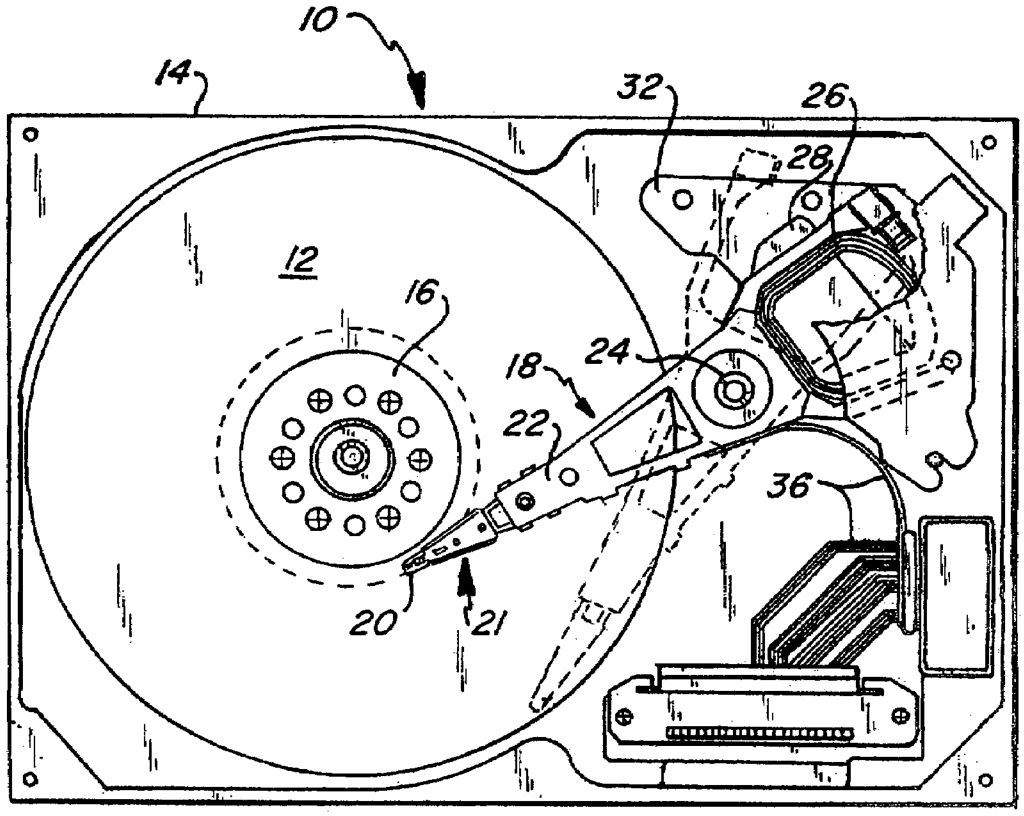
Fig. 1
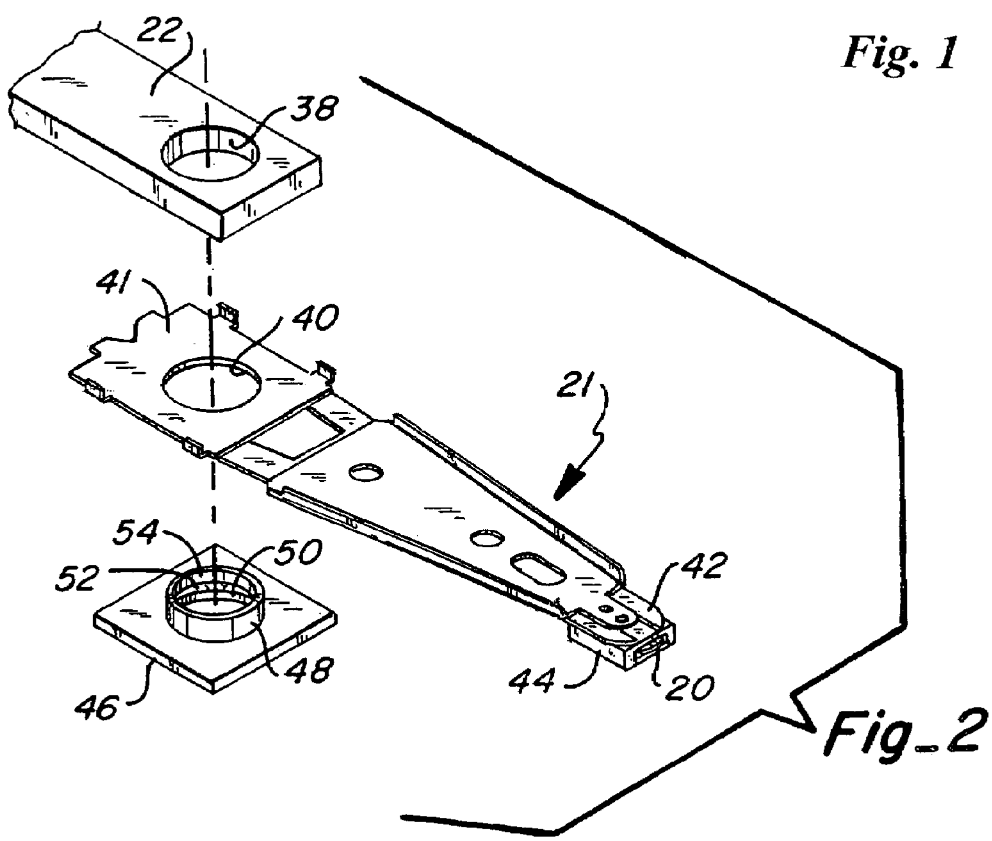
Fig_2

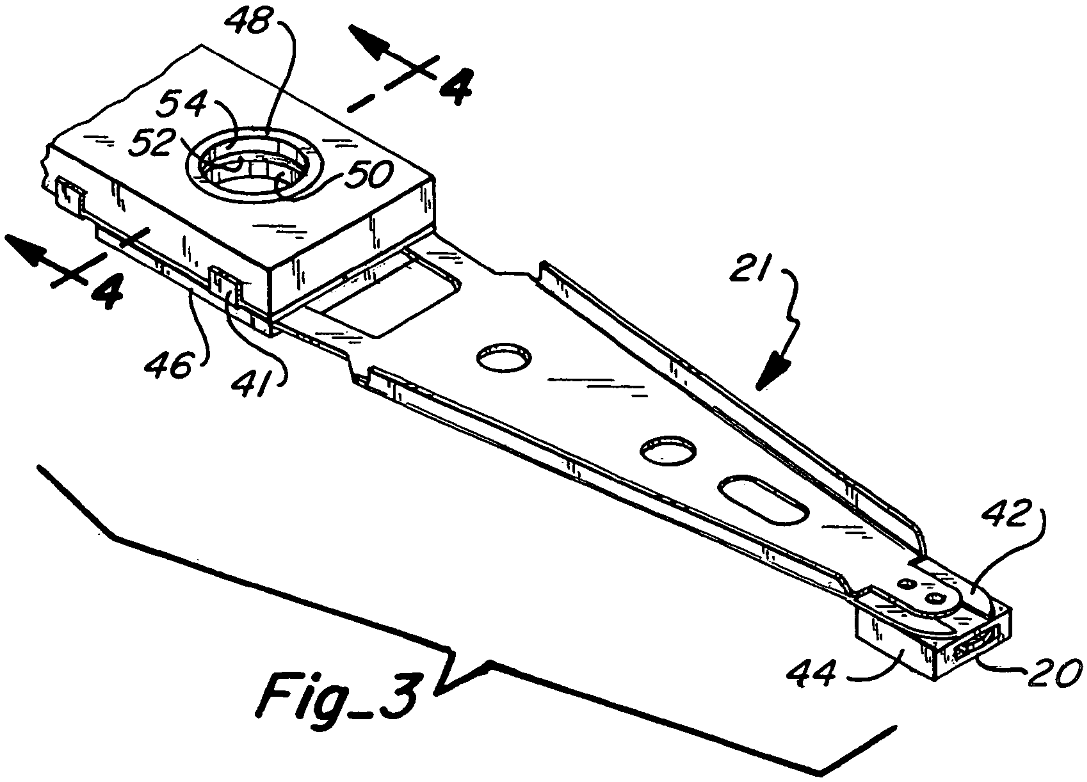
Fig_3
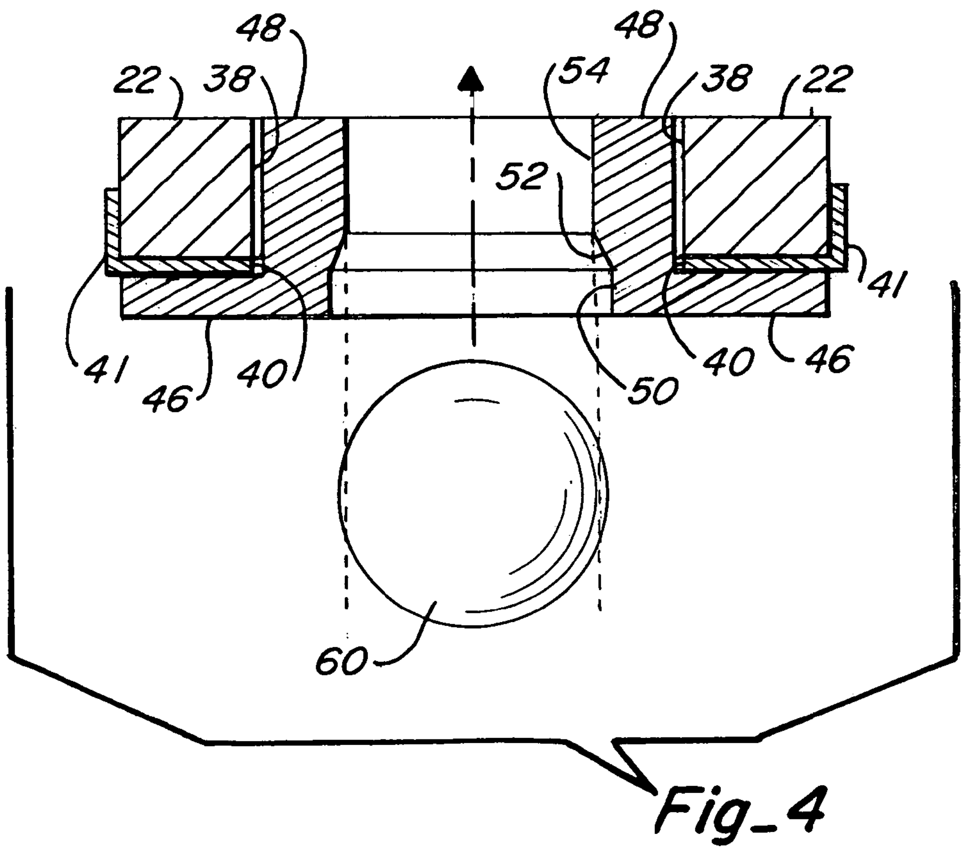
Fig_4

METHOD OF ASSEMBLING AN ACTUATOR ASSEMBLY OF A DISK DRIVE AND OF REDUCING TORQUE OUT RETENTION VALUES IN SUBSEQUENT DE-SWAGING

CROSS REFERENCE TO RELATED APPLICATIONS

Priority is claimed from U.S. Provisional Patent Application No. 60/239,159, filed on Oct. 10, 2000, and entitled "Suspension Swage Plate Process" the disclosure of which is incorporated herein by reference in its entirety.

FIELD OF THE INVENTION

This invention relates in general to disk drives, and more particularly, to application of a solid film lubricant to components in a disk drive assembled by a swage process.

BACKGROUND OF THE INVENTION

Magnetic-disk drives generally utilize rotary actuators to position one or more magnetic read/write heads (also known as transducers) with respect to a similar number of magnetic disks rotatably mounted on a hub driven by a motor. The read/write heads are moved among particular tracks of the magnetic disk to gain access to the information recorded on that track and/or to write information to a particular location on the disk.

The read/write heads are mounted on an air bearing slider. The slider positions the read/write heads above the data surface of the disk by a cushion of air generated by the rotating disk. Alternatively, the slider may operate in contact with the surface of the disk. The slider is mounted to a suspension load beam or suspension arm assembly. The suspension arm maintains the read/write heads and the slider adjacent to or in contact with the data surface of the disk with as low a loading force as possible. The combination of the read/write heads, slider and suspension arm is sometimes referred to as the head gimbal assembly (HGA).

The suspension arm is connected to the distal end of a rotary actuator arm pivotally installed within the housing of the disk drive. A voice coil motor pivots the actuator arm to position the read/write heads over desired tracks at selected radii of the magnetic disks.

Currently, ball swaging is the preferred method of attachment of the suspension arm to the actuator arm. Generally, swaging is a process for connecting metallic components. The wall of a thin tubular component is expanded in compression against a complementary component wherein the thin tubular component experiences some degree of plastic deformation. More specifically, with respect to this invention, the process of swaging a suspension arm to an actuator arm involves pressing and fastening the periphery of a boss or sleeve of the suspension arm to the inner face or wall of a through-hole formed in the actuator arm. The boss or sleeve is typically integral with a mounting plate or baseplate attached to the suspension arm. To attach the suspension arm to the actuator arm, the boss is inserted into the through-hole formed in the actuator arm. Then, a swage ball having a diameter larger than the inner diameter of the opening of the boss is passed completely through the opening of the boss, forcing the boss against the inner wall of the through-hole. Depending upon the size of the swage ball relative to the through-hole, the inner wall defining the through-hole in the actuator arm will undergo a range of deformation from little to extensive. The swaging process generally provides a stronger connection than a press fit because the boss is work hardened by the deformation which actually increases tensile strength. Nevertheless, the deformation must be sufficient to reliably hold the separate pieces together. Unfortunately, the swage ball can tear away metal as it is forced through the through-hole and cause cracking and metal failure. The loose metal pieces may adhere to the perimeter of the exit side of the through-hole, like a metal burr, which may then dislodge after assembly of the drive, thereby placing metal debris on the surface of a disk. Such debris, if it breaks away, can cause extensive damage to the disk. Moreover, the quantity of the debris can increase if the pieces are plated, such as nickel-plated pieces. In addition, the swaging process can alter the attitude of the suspension, thereby changing the position of the slider relative to the disk in the final assembly. If the flying characteristics of the slider are changed as a result, the flying dynamics of the slider and the overall performance of the drive may be adversely affected. Thus, it can be seen that there is a need for a lubricant in the swaging process.

Deswaging is the process of disconnecting components that have been joined by swaging. It is often desirable to deswage components when a drive needs to be reworked, as in the case when testing reveals problems in operation or function of the disk drive. For example, testing may reveal that a transducer is not performing properly and needs replacing. In such a circumstance, it is desirable to deswage the suspension arm from the actuator arm and replace it with a new suspension arm, slider and transducer; however, it is desirable to re-use the original actuator arm.

As previously described, swaging is a severe process, particularly with nickel-plated metal actuators and suspension arms. The swaging process creates a retention torque between the mating metal pieces that must be overcome to separate or free the metal pieces from each other. As a result, deswaging of parts can cause damage to both the actuator arm and the boss of the suspension arm manifesting in the form of cracking and other material failures. Such failures can contribute to undesirable contamination due to creation of particles. Accordingly, it can be seen that there is also a need for providing a lubricant which helps to prevent the failure of contact services in a de-swaging process.

It is known in the art of swaging to apply an isopropyl alcohol to members which come into contact with one another during the swaging process. Presumably, the purpose of applying the isopropyl alcohol during the process is to provide some type of lubrication among the members in contact, and then the isopropyl alcohol evaporates leaving no residue. Although a liquid lubricant of this type may have certain advantages in the swaging process, it is also known that isopropyl alcohol is not a very effective lubricant. Regardless, isopropyl alcohol applied in the swaging process does not provide lubrication in later de-swaging because the alcohol will have evaporated.

The U.S. Pat. No. 5,879,578 discloses a lubricated swage ball for use in swaging a head gimbal assembly to an actuator arm in a disk drive. The purpose of using a lubricated swage ball in this reference is to reduce transfer of aluminum oxide, or other hard materials which can be deposited on a disk during the swaging process. The swage balls are first pretreated by cleaning and then by etching to remove residual alumina from their surfaces. The cleaned, etched swage balls are then lubricated in a fluorocarbon lubricating system. Although this reference may address lubrication of a swage ball, this reference does not disclose the need to lubricate mating parts of the actuator arm and the suspension arm. Also, the inventors of the present application have learned from experimentation that swage balls may not rotate upon insertion into the through-hole, if the tolerances are sufficiently small to attain proper swaging. As a result, any lubrication is quickly scraped off by initial contact between the swage ball and side walls of the through-hole, leaving metal on metal contact.

SUMMARY OF THE INVENTION

The present invention involves the application of a lubricant to metal parts of a disk drive prior to swaging. In one aspect of the invention, an improved disk drive is provided which includes a lubricant polymer coating applied to components of the actuator arm and suspension arm which come into contact during the swage process. The portions of the components which come into contact with one another can be defined as swage contact surfaces.

In another aspect of the invention, a method of assembling an actuator assembly is provided including the step of depositing a polymer film or a solid film to selected elements of an actuator arm and suspension arm prior to swaging.

In yet another aspect of the invention, various methods may be used in applying the lubricant coating to the respective components of the disk drive. Such methods contemplated herein include localized spray, vacuum deposition, CVD (chemical vapor deposition), PE-CVD (plasma enhanced chemical vapor deposition), ion beam deposition, cathodic arc deposition, and sputter deposition.

One lubricant which has been found to provide good results is a fluorocarbon polymer made from a diluted solution of a 3M® polymer FC722 (fluoroalkylmethacrylate). In testing performed, the polymer film was applied in thicknesses ranging from 20 angstroms to 175 angstroms to a number of actuators and suspension arms by a drain coating process, leaving a uniform layer of the lubricant on the inside surfaces of the through-hole of the actuator arm and the exterior surface of the boss of the suspension arm. Deswaging showed a pronounced decrease in retention torque, the torque needed to separate the two metal pieces. The testing further revealed a pronounced decrease in chipping of the metal components and improved deformation characteristics of the metal components following swaging. Surprisingly, use of the polymer coating also provided better uniformity in gram load throughout the head gimbal assembly.

Although this range of thicknesses, between 20 and 175 angstroms, has proven to be adequate for providing a desired amount of lubricant, it shall be understood that this is not a critical minimum or maximum thickness. Rather, thinner or thicker films are still advantageous for use in lubrication with the invention herein disclosed. Indeed, the inventors believe a monolayer, namely a film layer one molecule thick, will provide sufficient lubrication. Such a monolayer would be on the order of 5–7 angstroms depending upon the lubricant used.

Another lubricant that provides good results is solid films, such as solid fluorocarbon films. In testing using fluorocarbon solid films, a coating having a thickness ranging from 25 to 2700 angstroms was applied to a number of swage plates by plasma enhanced chemical vapor deposition of $CHF_3$. As with the polymer films, deswaging showed a pronounced decrease in retention torque. The testing further revealed a pronounced decrease in chipping of the metal components and improved deformation characteristics of the metal components following swaging. The use of the solid film coating also provided better uniformity in gram load throughout the head gimbal assembly. Similarly, the inventors believe a single monolayer film will provide adequate lubrication.

In general, fluorocarbon containing films are relatively inert, provide excellent lubrication, and take the form of polymer or solid films. The FC 722 is a solid like, lubricating film composed of a polymer with a distribution of molecular weights. In the deposition processes mentioned above, the solid lubricant precursor is a fluorocarbon containing gas, a fluorocarbon containing solid substance, or a combination of fluorocarbons containing gases with fluorocarbon solids, depending upon the deposition technique used to deposit the lubricant film.

These and various other advantages and features which characterize the invention are pointed out with particularity in the claims annexed hereto, and form a part of the disclosure hereof. Additionally, other advantages and features of the invention are disclosed in the description which follows, taken in conjunction with the accompanying drawings.

BRIEF DESCRIPTION OF THE DRAWINGS

FIG. 1 is a plan view disclosing an example of a typical hard disk drive including at least one actuator assembly;

FIG. 2 is a greatly enlarged fragmentary, exploded, perspective view of an actuator arm, a head gimbal assembly (HGA), and a swage plate including a swage boss extending therefrom;

FIG. 3 is another greatly enlarged fragmentary perspective view of the components illustrated in FIG. 2, but said components being assembled; and FIG. 4 is a greatly enlarged vertical section taken along line 4—4 of FIG. 3 illustrating the actuator arm and the suspension arm prior to swaging.

DETAILED DESCRIPTION

FIG. 1 shows a plan view of a disk drive assembly 10, with the top cover removed. FIG. 1 is representative of any number of common disk drives. The disk drive assembly 10 illustrated herein includes at least one disk 12, typically having magnetic media on both the upper and lower surfaces thereof. The disk 12 along with other components of the disk drive are contained within a housing 14. The disk 12 is mounted over a hub 16 which is driven by a motor (not shown) enabling the disk to rotate at high revolutions per minute during operation. An actuator assembly 18 is shown rotatably mounted to an actuator pivot 24. Basic components of the actuator assembly 18 shown include one or more read/write heads 20 mounted on a flexure arm or suspension arm assembly 21. Suspension arm 21, in turn, is attached to an actuator arm 22, as further discussed below. In solid lines, the actuator assembly 18 is shown parked over the landing zone. The landing zone has been represented by the area of the disk 12 on or adjacent disk track 30. The landing area of the disk is allocated for takeoff and landing of the read/write heads 20 during spin-up and spin-down of the disk. The actuator assembly 18 is rotated to a desired disk track by a voice coil motor shown as voice coil 26. The voice coil 26 is immersed in a magnetic field generated by the magnet 28. An actuator control circuit (not shown) causes current flow in the voice coil motor 26, and ultimately controls the position of the actuator assembly 18 by varying current through the voice coil. The dotted position of actuator assembly 18 illustrates the manner in which actuator assembly 18 rotates about actuator pivot 24 in response to the voice coil motor 26. The magnet 28 is mounted to a mounting plate 32. FIG. 1 also shows other common elements of a disk drive including a communications bus 36 which transfers electronic signals to and from the read/write heads 20.

Now referring to FIG. 2, the distal end of the actuator arm 22 is illustrated, along with the head gimbal assembly (HGA), and a swage plate. More specifically, the distal end of the actuator arm 22 includes a through-hole or opening defined by inner face or wall 38. The proximal end of the suspension arm 21 includes a base portion 41 having an opening or hole formed therethrough, defined by inner face or wall 40. Other components of the suspension arm are also shown including a flexure member 42 which is attached to the distal end of the suspension arm 21, and a slider 44 mounted to the flexure member 42. The slider 44 houses the transducer/read/write heads 20.

Although a specific design is shown for the actuator arm and suspension arm, it shall be understood that the invention is not limited by this specific design, and the methods and apparatuses claimed herein apply to any actuator arm assembly including a swage-type connection.

One form of a swage plate 46 is also illustrated in FIG. 2. The swage plate 46 includes an integral swage boss 48 extending from the swage plate 46. The swage boss 48 is a cylindrical shape member which is inserted through openings 40 and 38 when assembled with the actuator arm and suspension arm. Swage plate 46 may be welded to the base portion 41, or may be attached by other known means in the art. As shown in FIG. 3, the boss 48 has been inserted through openings 40 and 38 for attachment of the suspension arm 21 to the actuator arm 22.

FIG. 4 illustrates the suspension arm 22 and the actuator arm 21 along with the swage boss 48 and swage plate 46 prior to swaging. As shown, there is a definable gap between the exterior surface of the swage boss 48, and the openings 38 and 40. A swage ball 60 is forced through the opening in the swage boss 48. The swage boss 48 opening may include a larger diameter portion 50, a smaller diameter portion 54, and a stepped or interconnecting portion 52. The swage ball 60 is forced through the opening and because the diameter of the swage ball 60 is larger than portions 54 and 52, the boss is deformed to accommodate passage of the swage ball. This deformation results in expansion of the swage boss 48 so that the exterior surface thereof is pressed in contact with surfaces 38 and 40. Absent an applied lubricant as described herein, swaging is a harsh process that generates significant debris, due to the severe metal deformation. By lubricating the surfaces that come in contact during swaging, damage to the components is lessened and chipping or creation of metal debris is reduced. The swaging process can also impart a bend or curve into the actuator arm thereby altering its performance. The lubrication described herein also reduces the forces that tend to distort the actuator arm and help maintain the actuator arm within its design criteria.

During a deswaging process to separate the actuator arm from the suspension arm, a forcing implement or tool (not shown) presses the swage boss 48 back through the openings defined by surfaces 38 and 40. This forcing action can also result in damage to the actuator arm and suspension arm, and therefore can result in disk drive contamination due to particles generated by chipping and other material failures. By lubricating the surfaces that come in contact during swaging, torque retention values are reduced, which provides better predictability in application of a load to deswage the actuator arm from the suspension arm. This predictability can therefore prevent overloading, underloading, and multiple loading attempts to deswage. Accordingly, there is less of a chance that damage will occur to the suspension arm and actuator arm.

Various methods are contemplated in applying the lubricating film. Additionally, it is also contemplated that application of the lubricating film can be conducted prior to attaching the swage plate to the suspension arm, as well as selected application of the lubricant to different components.

One method in which to apply the lubricant film is to first attach the swage plate 46 to the base portion 41 of the suspension arm 21, immerse the entire base portion 41 in a dilute solution of the FC 722 (for example, a 1.0% fluorine containing polymer in 99.0% PF 5060 fluorocarbon solvent), and then drain away the dilute solution from the base portion 41 at a preselected, constant rate (for example, 200 mm/sec) leaving a uniform film of the polymer on the surfaces of the base portion 41. Of course, the surface which is desired to be coated is the outer surface of the swage boss 48 which will inherently become coated by dipping of the base portion 41. Increasing or decreasing the drain rate and adjusting the concentration of the coating solution will determine the thickness of the coating applied. As mentioned above, it has been found that a polymer film having a thickness ranging from 20 to 175 angstroms is adequate and, in the case of solid films, a lubricant having a thickness ranging from 20 to 2700 angstroms is adequate; however, thinner or thicker films can be applied as desired, including a layer one molecule thick. An additional advantage of utilizing a fluorocarbon solvent is the cleaning effect upon the components. Application of the thin film lubricant can be conducted in a two step drain process, with the first step providing solvent cleaning and an initial coating, and the second step providing the final desired thickness of coating.

Another method in which to coat the components would be to only immerse the swage plate 46 and boss 48, prior to attaching the swage plate to the suspension arm. In this method, there would be no film lubricant applied to any surfaces of the suspension arm. This method may be preferred if it is desired to also limit the components of the disk drive subject to coating. Alternatively, the inner face or wall 38 of the actuator arm 22 may be coated with the film lubricant to provide the desired lubrication. Accordingly, the distal end of the actuator arm 22 may also be immersed in a dilute solution of the FC 722, or any other acceptable polymer or solid film. Examples of such include thin films formed from organic sulphurs, organic phosphorus, oxygen containing organics (such as carboxylic, esters and alcohols), nitrogen containing organics, organic boron compounds and metal containing compounds.

Depending upon the type of materials making up the actuator arm and suspension arm, as well as desired torque out retention values, it is also contemplated that one may select only the inner face 38 to be lubricated, only the outer surface of the swage boss 48 to be lubricated, or both surfaces may be lubricated.

In addition to immersing, other methods of applying the lubricant are also contemplated for each of the components to include localized spraying, and the various deposition processes listed above.

An unexpected result of lubrication of the swage contact surfaces is that gram load uniformity was also improved. As understood by those skilled in the art, gram load uniformity refers to the normal load placed on the disk by the suspension elements of the actuator assembly (i.e., the suspension arm, and complimentary elements). It is desirable to have gram load uniformity among each of the actuator assemblies in a disk drive. Gram load uniformity affects a number of disk drive operation variables, to include fly height of the read/write heads. It is believed that by lubricating the swage contact surfaces by a solid lubricant, the lubricant minimizes deleterious effects which the swage process may impart upon the structure of the actuator arm and suspension arm, thus improving gram load uniformity.

Coating the swage contact surfaces with a thin film lubricant enhances the deformation characteristics of the swage boss, facilitates reduction in the retention torque, and provides better consistency in torque out retention values. Each of these attributes contributes in reducing chipping and other potential material failure of the swage contact surfaces. Because of the many methods available in applying thin film lubricants, many options are available for application of the lubricant. Additionally, one or more selected surfaces may be lubricated to achieve desired results.

This invention has been described with respect to a particular disclosed embodiment; however, it will be understood that various other modifications can be made which fall within the spirit and scope of this invention.

What is claimed is:

1. A method of assembling an actuator assembly of a disk drive, said method comprising the steps of:

providing an actuator arm having a proximal end, a distal end, and an opening formed adjacent the distal end thereof;

providing a suspension arm having a proximal end, a distal end, and an opening formed adjacent the proximal end thereof;

said providing a swage plate including a swage boss extending therefrom;

depositing a film lubricant upon at least an outer surface of said swage boss;

inserting the swage boss through the opening in the suspension arm and through the opening in the actuator arm;

attaching the suspension arm to the actuator arm by swaging the swage boss wherein a swage ball passes through the swage boss and contacts an inner surface of the swage boss but not the outer surface of the swage boss.

2. A method, as claimed in claim 1, further including the step of:

depositing a film lubricant on the opening in said distal end of the actuator arm prior to said attaching step.

3. A method, as claimed in claim 1, wherein:

said film is deposited upon the swage boss by immersing the swage boss in a dilute solution containing the film lubricant, and then draining the solution at a selected rate or raising the swage boss out of the coating solution at a desired rate.

4. A method, as claimed in claim 1, wherein said film lubricant is deposited upon the swage boss by spraying.

5. A method, as claimed in claim 1, wherein said film lubricant is deposited upon the swage boss by vacuum deposition.

6. A method, as claimed in claim 1, wherein said film lubricant is a polymer film.

7. A method, as claimed in claim 6, wherein said polymer comprises fluorocarbon.

8. A method, as claimed in claim 1, wherein said film lubricant is a solid film.

9. A method, as claimed in claim 8, wherein said solid film comprises fluorocarbon.

10. A method of assembling an actuator assembly of a disk drive, said method comprising the steps of:

providing an actuator arm including an opening formed adjacent a distal end thereof;

providing a suspension arm including an opening formed adjacent a proximal end thereof;

providing a swage member including a swage boss;

depositing a lubricant upon at least an outer surface of said swage boss;

inserting the swage boss through the opening in the suspension arm and through the opening in the actuator arm; and attaching the suspension arm to the actuator arm by swaging wherein a swage ball passes through the swage boss and deforms an inner surface of the swage boss, the swage ball not contacting the outer surface of the swage boss.

* * * * *